United States Patent
Fukaya

(10) Patent No.: US 11,308,374 B2
(45) Date of Patent: *Apr. 19, 2022

(54) IMAGE FORMING APPARATUS AND METHOD CONDITIONALLY ESTIMATING REMAINING TONER USING CORRECTION INFORMATION

(71) Applicant: TOSHIBA TEC KABUSHIKI KAISHA, Tokyo (JP)

(72) Inventor: Hideaki Fukaya, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,782

(22) Filed: Aug. 10, 2020

(65) Prior Publication Data

US 2021/0073605 A1 Mar. 11, 2021

Related U.S. Application Data

(63) Continuation of application No. 16/564,102, filed on Sep. 9, 2019, now Pat. No. 10,776,676.

(51) Int. Cl.
*G06K 15/00* (2006.01)
*G03G 15/08* (2006.01)
(Continued)

(52) U.S. Cl.
CPC ..... *G06K 15/4075* (2013.01); *G03G 15/0856* (2013.01); *G03G 15/556* (2013.01);
(Continued)

(58) Field of Classification Search
CPC ........... H04N 1/00015; H04N 1/00034; H04N 1/00068; H04N 1/00076; H04N 1/00954;
(Continued)

(56) References Cited

U.S. PATENT DOCUMENTS 7,415,214 B2 8/2008 Sakita et al.
7,478,900 B2 1/2009 Hasegawa et al.
(Continued)

FOREIGN PATENT DOCUMENTS

JP 2003-149933 5/2003
JP 2004-226868 8/2004

*Primary Examiner* — Scott A Rogers
(74) *Attorney, Agent, or Firm* — Amin, Turocy & Watson, LLP

(57) ABSTRACT

According to one embodiment, an image forming apparatus includes a printer unit that includes a driving member related to the supply of the developer, a storage unit that stores correction information regarding the correction of a supplied amount of the developer and a remaining amount of the developer, and a control unit. The control unit acquires driving information regarding the driving of the driving member. The control unit acquires the correction information in accordance with the remaining amount of the developer and estimates the remaining amount of developer based on the driving information and the correction information when the remaining amount of the developer stored in the storage unit satisfies a predetermined condition regarding the remaining amount, and estimates the remaining amount of the developer based on the driving information when the remaining amount of the developer stored in the storage unit does not satisfy the predetermined condition.

20 Claims, 7 Drawing Sheets

(51) Int. Cl.
  *H04N 1/00*   (2006.01)
  *H04N 1/23*   (2006.01)
  *G03G 15/00*  (2006.01)

(52) U.S. Cl.
  CPC ..... *H04N 1/00015* (2013.01); *H04N 1/00034* (2013.01); *H04N 1/00068* (2013.01); *H04N 1/00076* (2013.01); *H04N 1/00954* (2013.01); *H04N 1/2315* (2013.01); *H04N 1/2346* (2013.01); *H04N 1/2392* (2013.01)

(58) Field of Classification Search
  CPC .. H04N 1/2307; H04N 1/2315; H04N 1/2346; H04N 1/2369; H04N 1/2392; H04N 1/29; H04N 1/295; H04N 1/00071–00087; G06K 15/14; G06K 15/407; G06K 15/4075; G03G 15/0822–0893; G03G 15/0856–0862; G03G 15/556; G03G 21/02; G03G 2215/066–0697; B41J 2/17566; B41J 2002/17569
  See application file for complete search history.

(56) References Cited

U.S. PATENT DOCUMENTS

| | | |
|---|---|---|
| 7,630,655 B2 | 12/2009 | Namiki et al. |
| 9,128,443 B2 | 9/2015 | Leemhuis et al. |
| 9,268,283 B1 | 2/2016 | Sugiyama |
| 10,663,882 B1 * | 5/2020 | Koike ................ G03G 15/0856 |
| 10,776,676 B1 * | 9/2020 | Fukaya .............. H04N 1/00954 |
| 10,962,901 B2 * | 3/2021 | Makinodan ........ G03G 15/0856 |

* cited by examiner

FIG. 4

| SECTION | REMAINING AMOUNT OF TONER (%) | CORRECTION AMOUNT |
|---|---|---|
| FIRST SECTION | 100% TO 10% OR MORE | 1 |
| SECOND SECTION | LESS THAN 10% TO 6% OR MORE | 1/2 |
| THIRD SECTION | LESS THAN 6% TO 4% OR MORE | 1/5 |
| FOURTH SECTION | LESS THAN 4% TO 2% OR MORE | 1/10 |
| FIFTH SECTION | LESS THAN 2% TO 1% OR MORE | 1/20 |

IMAGE FORMING APPARATUS AND METHOD CONDITIONALLY ESTIMATING REMAINING TONER USING CORRECTION INFORMATION

CROSS-REFERENCE TO RELATED APPLICATION

This application is a Continuation of application Ser. No. 16/564,102 filed on Sep. 9, 2019, the entire contents of which are incorporated herein by reference.

FIELD

Embodiments described herein relate generally to an image forming apparatus and an estimation method.

BACKGROUND

There are image forming apparatuses that estimate the remaining amount of toner accommodated in toner cartridges. Various techniques for estimating the remaining amount of toner are examined. For example, there is a technique for calculating the remaining amount of toner based on the rotation time of toner supply motors. However, in the technique, estimation of the remaining amount of toner deviates in accordance with a decrease in the remaining amount of toner accommodated in a toner cartridge in some cases.

DESCRIPTION OF THE DRAWINGS

FIG. 4 is a diagram illustrating a specific example of a count value correction table;

DETAILED DESCRIPTION

In general, according to one embodiment, an image forming apparatus includes a printer unit, a storage unit, and a control unit. The printer unit forms an image on a sheet with a developer and includes a driving member related to the supply of the developer. The storage unit stores correction information regarding the correction of a supplied amount of the developer and the remaining amount of the developer. The control unit acquires driving information regarding the driving of the driving member. The control unit acquires the correction information in accordance with the remaining amount of the developer and estimates the remaining amount of the developer based on the driving information and the correction information when the remaining amount of the developer stored in the storage unit satisfies a predetermined condition regarding the remaining amount, and estimates the remaining amount of the developer based on the driving information when the remaining amount of the developer stored in the storage unit does not satisfy the predetermined condition.

Figure 1:
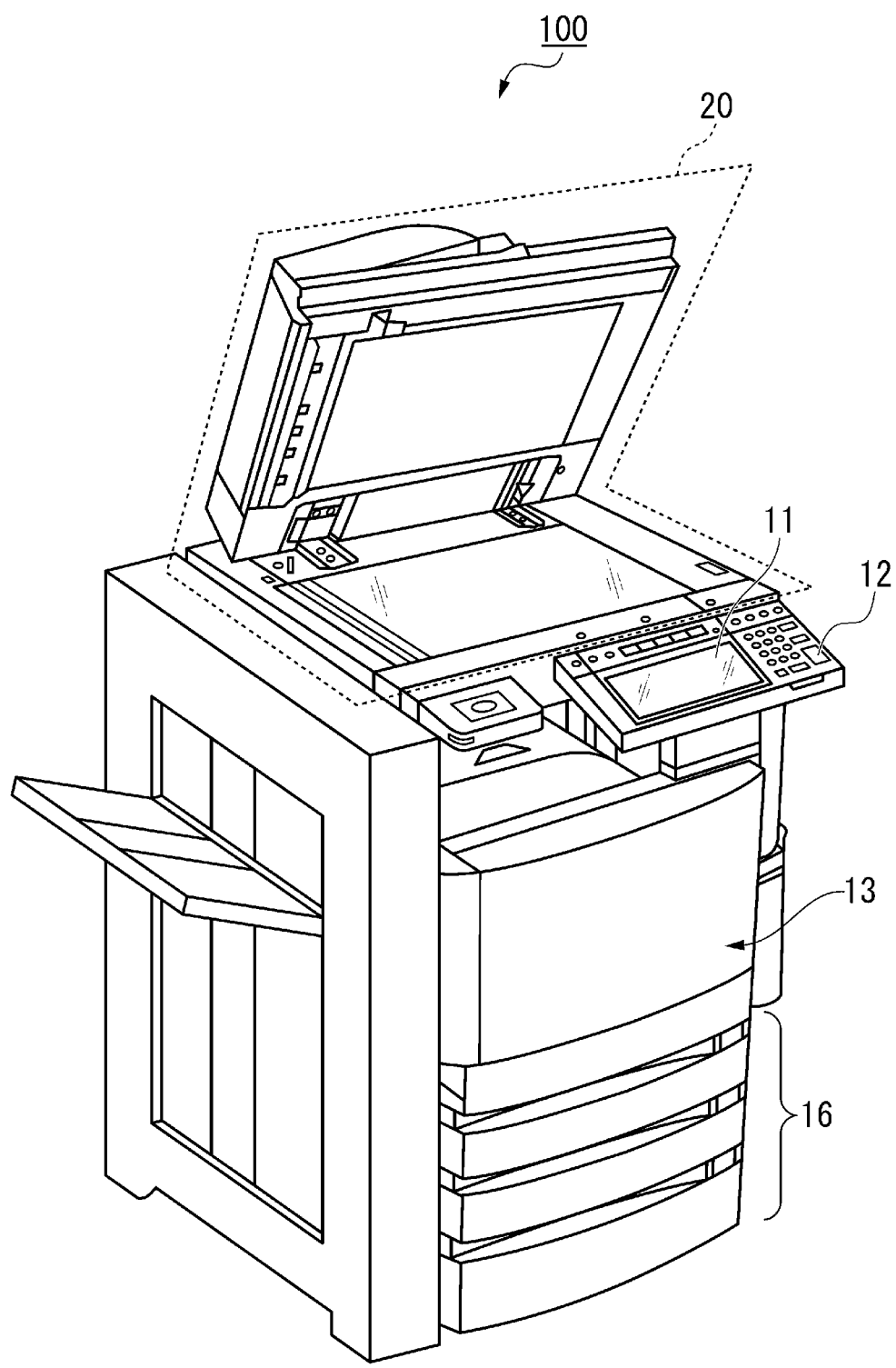
FIG. 1 is an external view illustrating an overall configuration example of an image forming apparatus according to an embodiment.

FIG. 1 is an external view illustrating an overall configuration example of an image forming apparatus 100 according to an embodiment. The image forming apparatus 100 is, for example, a multi-functional peripheral. The image forming apparatus 100 includes a display 11, a control panel 12, a printer unit 13, a sheet accommodation unit 16, and an image reading unit 20.

The printer unit 13 of the image forming apparatus 100 forms an image on a sheet using a developer such as a toner. The sheet is, for example, a paper or a label sheet. The sheet may be anything as long as the image forming apparatus 100 can form an image on the surface thereof.

Figure 2:
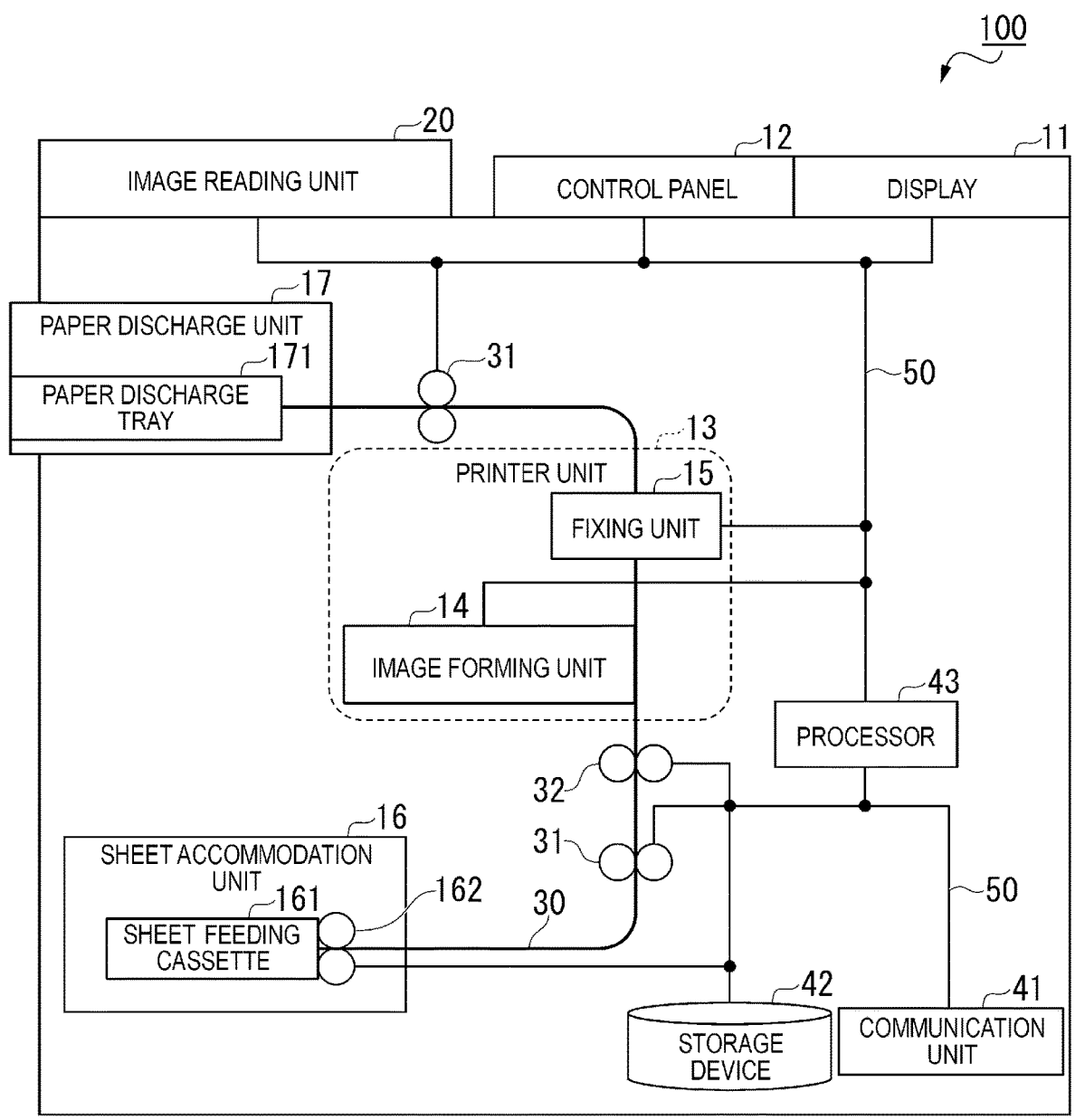
FIG. 2 is a block diagram illustrating a hardware configuration of the image forming apparatus.

FIG. 2 is a block diagram illustrating a hardware configuration of the image forming apparatus 100 according to the embodiment. The image forming apparatus 100 includes the display 11, the control panel 12, the printer unit 13, the sheet accommodation unit 16, a sheet discharge unit 17, the image reading unit 20, a conveyance roller 31, a registration roller 32, a communication unit 41, a storage device 42, and a processor 43. Each functional unit of the image forming apparatus 100 is connected to be able to perform data communication via a system bus 50.

The display 11 is an image display device such as a liquid crystal display or an organic electro luminescence (EL) display. The display 11 displays various kinds of information regarding the image forming apparatus 100.

The control panel 12 includes a plurality of buttons. The control panel 12 receives an operation by a user. The control panel 12 outputs a signal in response to the operation performed by the user to a control unit of the image forming apparatus 100. The display 11 and the control panel 12 may be configured as an integrated touch panel.

The printer unit 13 includes an image forming unit 14 and a fixing unit 15. The printer unit 13 forms an image on a sheet based on image information generated by the image reading unit 20 or image information received via a communication line. The printer unit 13 forms an image through, for example, the following process. The image forming unit 14 of the printer unit 13 forms an electrostatic latent image on a photosensitive drum based on the image information. The image forming unit 14 of the printer unit 13 forms a visible image by attaching the developer to the electrostatic latent image. As a specific example of the developer, there is a toner. A transfer unit (not illustrated) of the printer unit 13 transfers the visible image to the sheet. The fixing unit 15 of the printer unit 13 fixes the visible image onto the sheet by heating and pressurizing the sheet. The sheet on which the image is formed may be a sheet accommodated in the sheet accommodation unit 16 or may be a manually fed sheet. Hereinafter, the developer which is assumed to be toner will be described.

Figure 3:
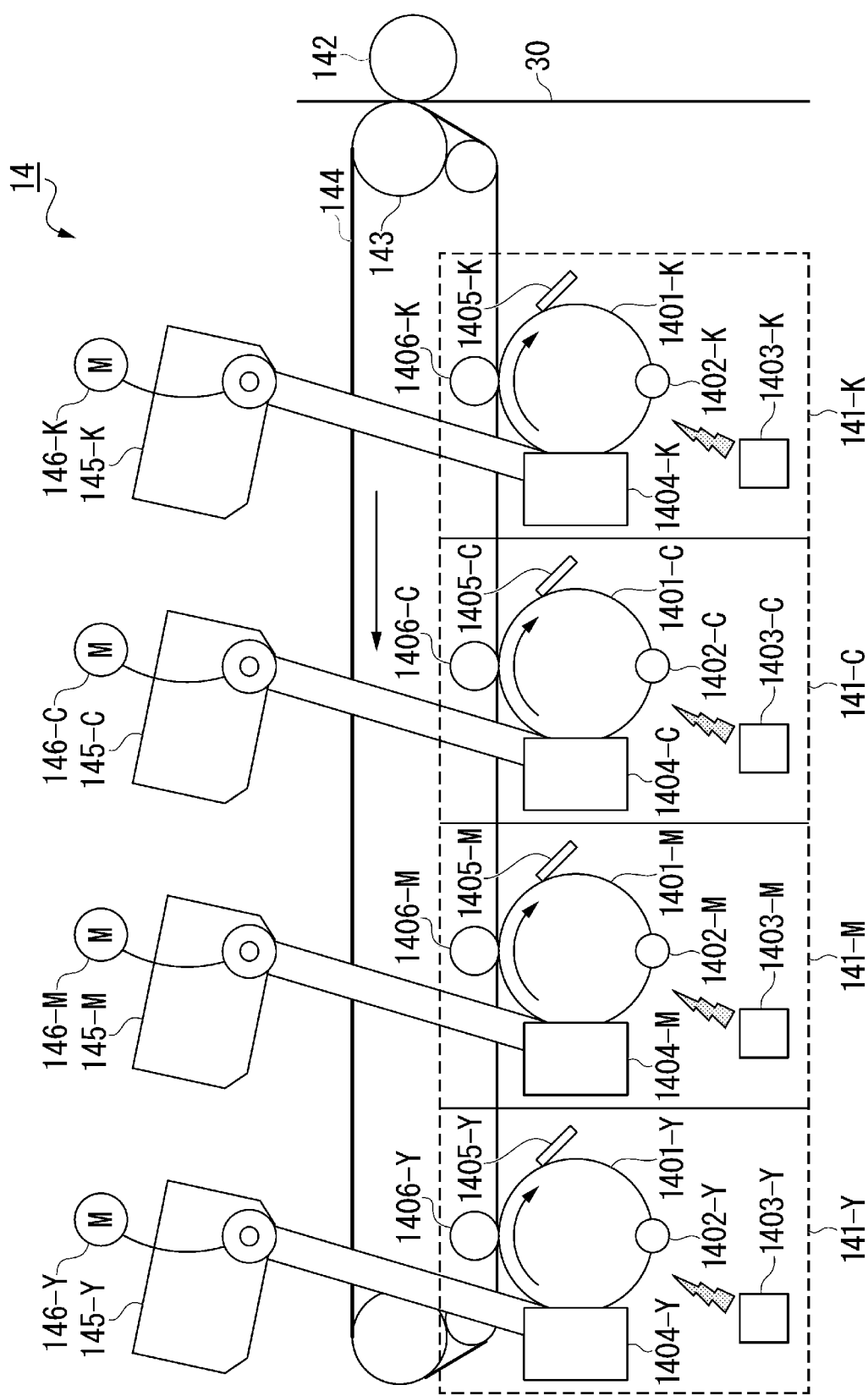
FIG. 3 is a diagram illustrating a configuration example of an image forming unit.

FIG. 3 is a diagram illustrating a configuration example of the image forming unit 14 according to the embodiment. The image forming unit 14 according to the embodiment forms an image with four colors of yellow, magenta, cyan, and black. The image forming unit 14 includes process units 141, a secondary transfer roller 142, a secondary transfer counter roller 143, an intermediate transfer belt 144, toner cartridges 145, and toner supply motors 146. The image forming unit 14 includes a processing unit 141, a toner cartridge 145, and a toner supply motor 146 for each color. In the image forming unit 14, the functional units corresponding to four colors are distinguished with Y, M, C, and K. Y indicates yellow. M indicates magenta. C indicates cyan. K indicates black. For example, 141-Y denotes the processing unit 141 for yellow. Hereinafter, when the process units, the toner cartridges, and the toner supply motors are not distinguished from each other, respectively, the processing unit 141, the toner cartridge 145, and the toner supply motor 146 are collectively described.

The processing unit 141 forms a toner image on the intermediate transfer belt 144 which is an endless belt. The processing unit 141 includes a photosensitive drum 1401, a charger 1402, an exposure device 1403, a developing device 1404, a photosensitive body cleaner 1405, and a primary transfer roller 1406. The process units 141 for four colors of Y, M, C, and K have the same configuration.

The photosensitive drum 1401 generates an electrostatic latent image on the own surface. The photosensitive drum 1401 is an image carrier. The photosensitive drum 1401 is, for example, a cylindrical drum. The photosensitive drum 1401 includes a photosensitive substance on the outer circumferential surface. The photosensitive drum 1401 has a property radiating static electricity to a portion to which light is radiated.

The charger 1402 charges the static electricity to the surface of the photosensitive drum 1401. The charger 1402 is, for example, a needle electrode. The exposure device 1403 forms an electrostatic latent image of a target image formed on the surface of the photosensitive drum 1401. The exposure device 1403 is, for example, a laser radiation device. The developing device 1404 supplies the toner to the surface of the photosensitive drum 1401. The developing device 1404 develops the electrostatic latent image with the toner. The photosensitive body cleaner 1405 removes the residual toner on the photosensitive drum 1401. The removed toner is collected in a waste toner tank (not illustrated). The removed toner is discarded. The primary transfer roller 1406 transfers the toner image developed on the surface of the photosensitive drum 1401 to the intermediate transfer belt 144.

The secondary transfer roller 142 transfers the toner image on the intermediate transfer belt 144 to the sheet. The secondary transfer counter roller 143 is provided at a position facing the secondary transfer roller 142. The secondary transfer counter roller 143 and the secondary transfer roller 142 pinches the conveyed sheet. The toner image is transferred to the sheet pinched between the secondary transfer roller 142 and the secondary transfer counter roller 143. The secondary transfer roller 142 and the secondary transfer counter roller 143 rotate to convey the sheet to which the toner image is transferred.

The image forming unit 14 includes the toner cartridge 145 filled with a toner of each color for each processing unit 141. The image forming unit 14 includes the toner cartridges 145 of four Y, M, C, and K colors. The toner cartridge 145 is charged with the toner for each color. In the image forming unit 14, for example, 145-Y denotes a yellow toner cartridge. Inside the toner cartridge 145, a toner conveyance member conveying the toner by rotation is included to convey the toner toward a toner outlet. The toner conveyance member is, for example, a rotatable member that includes a screw blade about a rotation shaft. The toner supply motor 146 rotates the toner conveyance member in response to a driving instruction from the processor 43. The toner conveyance member is rotated with the rotation of the toner supply motor 146. With the rotation of the toner conveyance member, the toner drops to the developing device 1404 via a pipe toward the toner outlet of the toner cartridge. The toner is supplied to the developing device 1404. The toner supply motor 146 is a kind of driving member. The driving member is a member related to the supply of the developer.

Referring back to FIG. 2, the image forming apparatus 100 will be continuously described. The sheet accommodation unit 16 includes a sheet feeding cassette 161 and a sheet discharging roller 162. The sheet feeding cassette 161 of the sheet accommodation unit 16 accommodates a sheet to be used to form an image in the printer unit 13. The sheet discharging roller 162 rotates in response to a rotation instruction from the processor 43. The sheet accommodated in the sheet feeding cassette 161 is conveyed to the printer unit 13 with the rotation of the sheet discharging roller 162. A conveyance path of the conveyed sheet is represented by a conveyance path 30.

The sheet discharge unit 17 includes a sheet discharge tray 171. The sheet discharged from the image forming apparatus 100 is placed on the sheet discharge tray 171. For example, the sheet conveyed from the sheet accommodation unit 16 along the conveyance path 30 is discharged to the sheet discharge tray 171.

The image reading unit 20 reads the image information of the reading target as brightness and darkness of light. The image reading unit 20 records the read image information. The recorded image information may be transmitted to another information processing apparatus via a network. The recorded image information may be formed as an image on the sheet by the printer unit 13.

The conveyance roller 31 rotates in response to a rotation instruction from the processor 43. The conveyance roller 31 conveys the sheet by rotation. The registration roller 32 makes the sheet tilted during the conveyance of the sheet horizontal. The registration roller 32 rotates in response to a rotation instruction from the processor 43. The registration roller 32 conveys the horizontal sheet by rotation.

The communication unit 41 is configured using a communication interface. The communication unit 41 communicates with an external device (for example, a management server) via the network according to a predetermined protocol.

The storage device 42 is configured using a storage device such as a magnetic hard disk device or a semiconductor storage device. The storage device 42 stores in advance data necessary when the image forming apparatus 100 operates. For example, the storage device 42 stores the remaining amount of toner of the toner cartridge accommodated in the image forming apparatus 100. The remaining amount of toner is an amount of toner remaining in the toner cartridge. For example, the remaining amount of toner is represented between 0% to 100% based on a cumulative count value and an upper limit count value to be described below. The remaining amount of toner is represented as 100%, for example, when the toner cartridge is not used. The remaining amount of toner is represented as 0%, for example, when the toner is all used. The remaining amount of toner is expressed in Expression (1) below, for example.

$$\text{Remaining amount of toner (\%)} = (1 - (\text{cumulative count value}/\text{upper limit count value})) \times 100 \qquad (1)$$

The upper limit count value indicates an upper limit of the cumulative count value. When the cumulative count value reaches the upper limit, the remaining amount of toner becomes 0%. The count value indicates a value obtained by counting an amount in accordance with the driving of the toner supply motor 146. The count value may be calculated, for example, by dividing the driving time of the toner supply motor 146 by the unit time. The count value may be counted once, for example, whenever the driving time of the toner supply motor 146 passes by unit time. The upper limit count value may be determined in advance in accordance with a capacity of the toner cartridge. The storage device 42 stores the upper limit count value in advance. In the embodiment, the unit time is assumed to be 1 second in the description. The unit time is not limited to 1 second. The unit time may be greater or less than 1 second. As the unit time, any time may be determined in advance.

The cumulative count value is a cumulative value of count values counted until a current time point after a new toner cartridge is mounted. The storage device 42 stores, for example, a cumulative count value of a toner cartridge accommodated in the image forming apparatus 100. The cumulative count value is expressed in Expression (2) below, for example.

$$\text{Cumulative count value} = \text{previous cumulative count value} + \text{count value} \quad (2)$$

The previous cumulative count value is a cumulative value of count values counted until the toner is supplied at the last time after a new toner cartridge is mounted. The storage device 42 stores the cumulative count value. The count value is calculated by dividing a driving time (second) of the toner supply motor 146 by the unit time and subsequently multiplying the divided value by a correction value as in Expression (3) below.

$$\text{Count value} = \text{driving time(second)} \div \text{unit time (second)} \times \text{correction value} \quad (3)$$

The driving time is a specific example of driving information. The driving information is information regarding the driving of the driving member.

The storage device 42 stores, for example, a remaining amount threshold. The remaining amount threshold is a threshold related to the amount of remaining toner. The remaining amount threshold is expressed as a percentage. As the remaining amount threshold, a predetermined value may be stored in advance. As the remaining amount threshold, a different value may be stored for each image forming apparatus 100 or each toner cartridge. The remaining amount threshold is used to determine whether the remaining amount of toner is nearly empty. The "nearly empty" indicates that the remaining amount of toner is close to emptiness (zero). The storage device 42 stores, for example, a count value correction table. The count value correction table is a table in which a correction value for correcting a count value in accordance with the remaining amount of toner is stored. The storage device 42 is a specific example of a storage unit.

FIG. 4 is a diagram illustrating a specific example of the count value correction table according to the embodiment. The count value correction table in FIG. 4 has a correction value for correcting a count value calculated based on the driving time of the toner supply motor 146 in accordance with the remaining amount of toner. The count value correction table has a correction record. The correction record includes information regarding the correction of a count value. The correction record has each value of a section, a remaining amount of toner (%), and a correction value. The section is information for identifying in which section the remaining amount of toner of the image forming apparatus 100 is included. The remaining amount of toner (%) indicates a range of the remaining amount of toner of the image forming apparatus 100 included in the section. The correction value indicates a correction value of each section in accordance with the remaining amount of toner when the correction value used to calculate the count value in a section of 10% to 100% of the remaining amount of toner is set to "1." The count value indicates a value equivalent to an amount of toner supplied when the toner supply motor 146 is driven for a predetermined time. That is, the count value is calculated by dividing a driving time (second) by the unit time and subsequently multiplying the divided value by a correction value. Each value of the count value correction table is not limited to the values in FIG. 4. The count value correction table may have different values depending on the use situation of a user or a kind of image forming apparatus 100. The correction record is a specific example of correction information.

In the example illustrated in FIG. 4, a section value is "first section," a value of the remaining amount of toner (%) is "100% to 10% or more, and a value of the correction value is "1" in the uppermost correction record of the count value correction table. Accordingly, according to the uppermost record of the count value correction table, the remaining amount of toner is included in "first section" when the remaining amount of toner is "100% to 10% or more." When the toner supply motor 146 is driven for 20 seconds, the count value is "20" since the correction value is "1." For example, on the assumption that a count value necessary to decrease the remaining amount of toner of the image forming apparatus 100 by 1% is 20, the toner supply motor 146 may be driven for 20 seconds when the remaining amount of toner is in the first section. Similarly, in order to reduce the remaining amount of toner by 1% when the remaining amount of toner is in a second section, the toner supply motor 146 may be driven for 40 seconds (=20 count/correction value). The count value correction table illustrated in FIG. 4 is merely a specific example. Therefore, the count value correction table may be configured in a format different from FIG. 4.

Referring back to FIG. 2, the image forming apparatus 100 will be continuously described. The processor 43 controls an operation of each functional unit of the image forming apparatus 100. The processor 43 is, for example, a central processing unit (CPU). The processor 43 executes a process by loading a software program stored in the storage device 42 on a memory such as a RAM and executing the software program. Hereinafter, a part of control performed by the processor 43 will be described.

The processor 43 detects emptiness of the remaining amount of toner included in the image forming apparatus 100. For example, the processor 43 determines whether the toner in the toner cartridge is empty based on an auto-toner sensor (not illustrated) provided in the developing device 1404. In this case, the processor 43 outputs a driving instruction to the toner supply motor 146. The toner supply motor 146 is driven for a predetermined time based on the driving instruction. When the toner remains in the toner cartridge, the toner is supplied to the developing device 1404 in accordance with the driving of the toner supply motor 146. The processor 43 determines that the toner in the toner cartridge is empty when a toner concentration ratio of the developing device 1404 does not increase.

The processor 43 determines whether the toner accommodated in the toner cartridge is nearly empty. The processor 43 may determine whether the toner is nearly empty, for example, based on the remaining amount of toner stored in the storage device 42. For example, the processor 43 determines that the toner is nearly empty when the remaining amount of toner is less than a remaining amount threshold.

Figure 5:
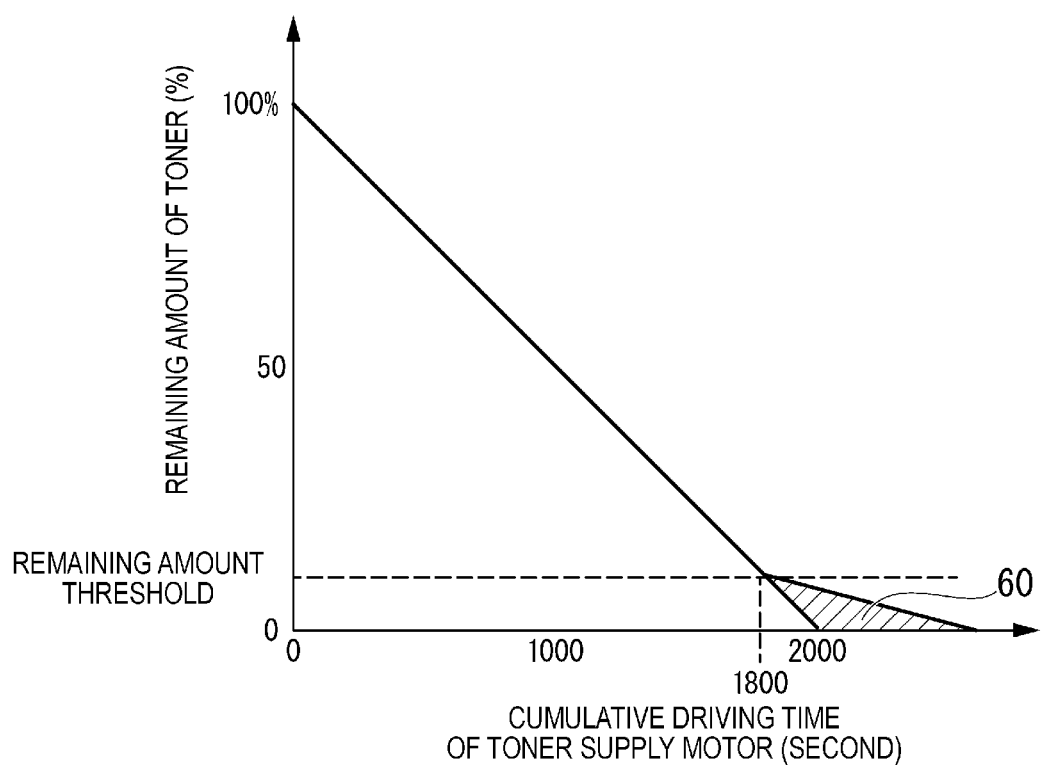
FIG. 5 is a diagram illustrating a specific example of a relationship between a cumulative driving time of a toner supply motor and a remaining amount of toner.

FIG. 5 is a diagram illustrating a specific example of a relationship between a cumulative driving time of the toner supply motor 146 and the remaining amount of toner according to the embodiment. In FIG. 5, the horizontal axis represents cumulative driving time (second) of the toner supply motor 146. The vertical axis represents a remaining amount of toner (%) in a toner cartridge. The initial value of the cumulative driving time (second) of the toner supply motor 146 is 0 (second). The initial value of the remaining amount of toner (%) is 100(%). In FIG. 5, the remaining amount of toner (%) decreases with an increase in the cumulative driving time (second) of the toner supply motor 146. When the remaining amount of toner is less than the remaining amount threshold, the processor 43 determines that the toner cartridge is nearly empty.

In the related art, a supplied amount of toner in accordance with the driving of the toner supply motor 146 decreases when the remaining amount of toner decreases. Therefore, as in FIG. 5, a cumulative driving time of the toner supply motor 146 is longer than 2000 seconds when the auto-toner sensor detects that the remaining amount of toner is empty. For example, a region 60 included in FIG. 5 indicates an example of cumulative driving time of the toner supply motor 146 and the remaining amount of toner until the remaining amount of toner is determined to be empty from the time when the remaining amount of toner is determined to be nearly empty. In this way, when the remaining amount of toner is nearly empty, the supplied amount of the toner decreases more than when the remaining amount of toner is not nearly empty.

Therefore, the processor 43 estimates a value close to the actual remaining amount of toner by correcting the count value for the driving time of the toner supply motor 146. The processor 43 can estimate an appropriate remaining amount of toner in accordance with a decrease in the remaining amount of toner by performing a larger correction on the count value as the remaining amount of toner decreases.

Figure 6:
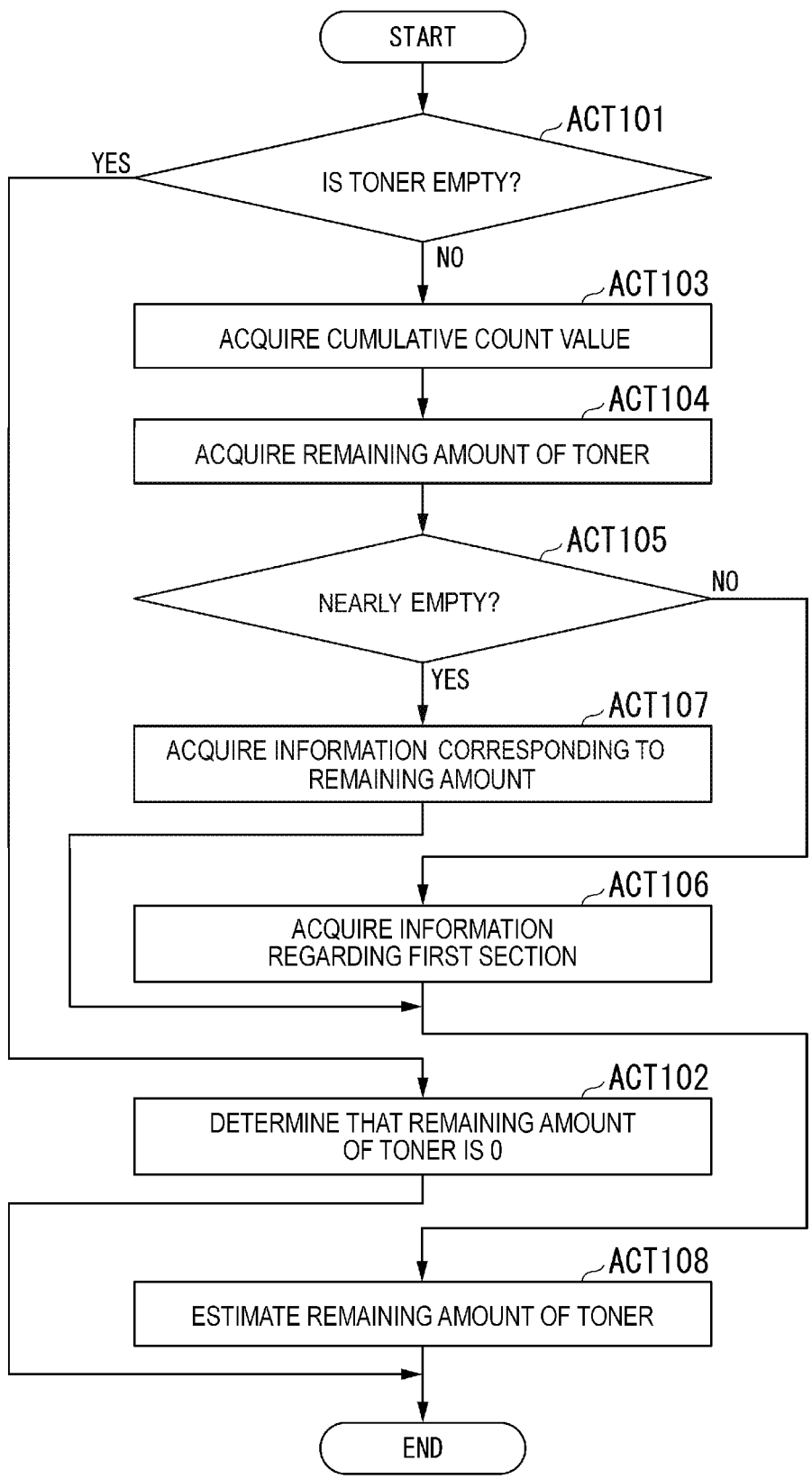
FIG. 6 is a flowchart illustrating a first specific example of a flow of a process of estimating the remaining amount of toner.

FIG. 6 is a flowchart illustrating a first specific example of a flow of a process of estimating the remaining amount of toner according to the embodiment. The process of estimating the remaining amount of toner is performed at a predetermined timing after the toner is supplied. The predetermined timing may be, for example, a timing at which an image forming process ends. The predetermined timing may be, for example, a timing at which an image is formed on a sheet.

The processor 43 determines whether the toner in the toner cartridge is empty (ACT101). Specifically, the processor 43 detects that the toner is empty based on the auto-toner sensor (not illustrated) provided in the developing device 1404. The processor 43 first outputs a driving instruction to drive the toner supply motor 146 for a predetermined time. The toner supply motor 146 is driven for the predetermined time based on the driving instruction. When the toner remains in the toner cartridge, the toner is supplied to the developing device 1404 in accordance with the driving of the toner supply motor 146. When the toner is supplied, the auto-toner sensor detects an increase of a toner concentration ratio inside the developing device 1404. When the toner concentration ratio of the developing device 1404 does not increase, the processor 43 determines that the toner in the toner cartridge is empty. When the toner concentration ratio of the developing device 1404 increases, the processor 43 determines that the toner in the toner cartridge is not empty. The processor 43 calculates a count value based on the driving time of the toner supply motor 146 driven in accordance with the driving instruction and adds the count value to the cumulative count value stored in the storage device 42. The processor 43 records the added cumulative count value in the storage device 42.

When it is determined the toner in the toner cartridge is empty (YES in ACT101), the processor 43 determines that the remaining amount of toner is 0 (ACT102). The processor 43 records the remaining amount of toner on the storage device 42.

When it is determined that the toner in the toner cartridge is not empty (NO in ACT101), the processor 43 acquires the cumulative count value (ACT103). Specifically, the processor 43 acquires the cumulative count value stored in the storage device 42. Subsequently, the processor 43 acquires the remaining amount of toner (ACT104). Specifically, the processor 43 acquires the remaining amount of toner stored in the storage device 42.

The processor 43 determines whether the remaining amount of toner is nearly empty (ACT105). Specifically, the processor 43 acquires the remaining amount threshold from the storage device 42. When the remaining amount of toner is less than the remaining amount threshold, the processor 43 determines that the remaining amount of toner is nearly empty. When the remaining amount of toner is the remaining amount threshold or greater, the processor 43 determines that the remaining amount of toner is not nearly empty.

When the remaining amount of toner is not nearly empty (NO in ACT105), the processor 43 acquires information regarding the first section (ACT106). Specifically, the processor 43 acquires the count value correction table from the storage device 42. The processor 43 acquires the correction record that has the values of the first section in the count value correction table (ACT106).

When the remaining amount of toner is nearly empty (YES in ACT105), the processor 43 acquires information corresponding to the remaining amount of toner (ACT107). Specifically, the processor 43 acquires the count value correction table from the storage device 42. The processor 43 acquires the correction record based on the remaining amount of toner and the value of the remaining amount of toner (%) of the count value correction table. For example, the processor 43 specifies the correction record including the value of the remaining amount of toner within the range of the value of the remaining amount of toner (%) of the correction record. The processor 43 acquires the specified correction record. For example, when the remaining amount of toner is 7%, the processor 43 acquires the correction record that has the values of the second section.

The processor 43 estimates the remaining amount of toner (ACT108). Specifically, the processor 43 acquires the correction value from the correction record. The processor 43 divides the driving time by the unit time. The processor 43 calculates the count value by multiplying the divided value by the correction value. When the correction value is 1, the processor 43 may use the value obtained by dividing the driving time by the unit time as the count value. The processor 43 acquires the cumulative count value as the cumulative count value at the previous time from the storage device 42. The processor 43 calculates the cumulative count value based on Expression (2). Next, the processor 43 estimates the remaining amount of toner. The processor 43 estimates the remaining amount of toner based on, for example, Expression (1). The processor 43 records the estimated remaining amount of toner and the cumulative count value on the storage device 42.

In FIG. 6, the processor 43 estimates the remaining amount of toner based on the cumulative count value. However, a method of estimating the remaining amount of toner is not limited thereto. The processor 43 may be configured to estimate the remaining amount of toner by another method. For example, the processor 43 may be configured to estimate the remaining amount of toner by reducing a value obtained by dividing the driving time by a supply time (second) of the correction record from the remaining amount of toner. Hereinafter, the description will be made specifically.

Figure 7:
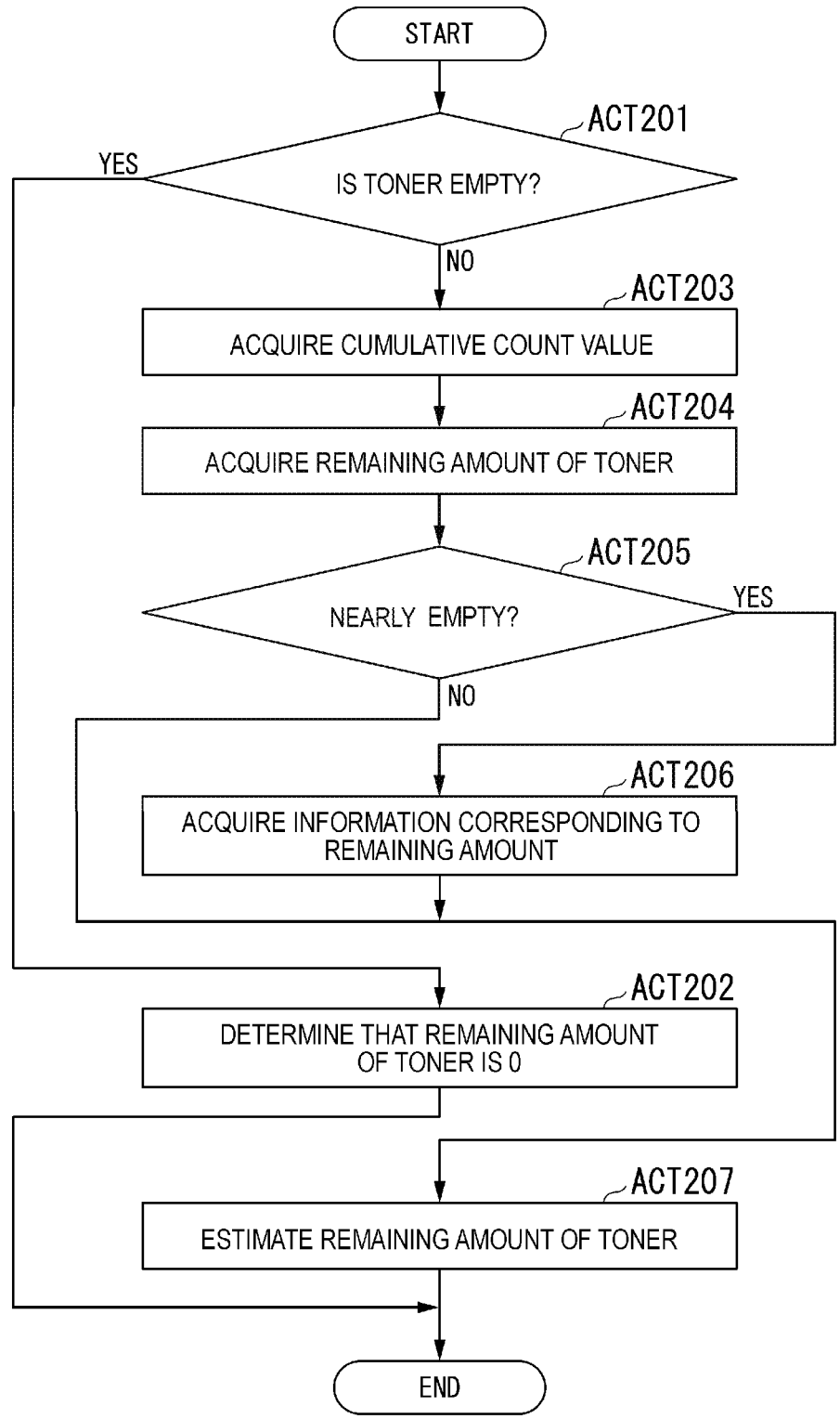
FIG. 7 is a flowchart illustrating a second specific example of the flow of the process of estimating the remaining amount of toner.

FIG. 7 is a flowchart illustrating a second specific example of the flow of the process of estimating a remaining amount of toner according to the embodiment. Since ACT201 to ACT205 are the same as ACT101 to ACT105, the description thereof will be omitted.

When the remaining amount of toner is not nearly empty (NO in ACT205), the process proceeds to ACT207. When the remaining amount of toner is nearly empty (YES in ACT205), the processor 43 acquires the information corresponding to the remaining amount of toner (ACT206). Specifically, the processor 43 acquires the count value correction table from the storage device 42. The processor 43 acquires the correction record based on the remaining amount of toner and the remaining amount of toner (%) of the count value correction table. For example, the processor 43 specifies the correction record including the remaining amount of toner within the range of the remaining amount of toner (%). The processor 43 acquires the specified correction record.

The processor 43 estimates the remaining amount of toner (ACT207). Specifically, the processor 43 acquires a correction value 2 from the correction record. The processor 43 divides the driving time by correction value 2. A value obtained through the dividing is a value indicating the count value. For example, the correction value 2 is 20 in the first section, 40 in the second section, 100 in the third section, 200 in the fourth section, and 400 in the fifth section. The processor 43 estimates the current remaining amount of toner by reducing the value obtained through the dividing from the remaining amount of toner. The processor 43 records the estimated remaining amount of toner on the storage device 42.

In the image forming apparatus 100 with such a configuration, the processor 43 acquires the driving time of the toner supply motor 146. The processor 43 acquires another correction value in accordance with the remaining amount of toner stored in the storage device 42. The processor 43 estimates the remaining amount of toner based on the driving time and the correction value. The image forming apparatus 100 can approach the estimated value of the remaining amount of toner to the actual remaining amount of toner accommodated in the toner cartridge by correcting the count value based on the driving time. Accordingly, a maintenance worker of the image forming apparatus 100 can reduce the toner remaining in the toner cartridge when the toner cartridge is exchanged. The user of the image forming apparatus 100 can order a toner cartridge when the remaining amount of toner is closer to emptiness, and thus it is possible to reduce the service cost. Even when the toner cartridge is nearly empty, the image forming apparatus 100 can suppress limitation of image forming.

Modification Examples

In the above-described embodiment, the processor 43 estimates the remaining amount of toner based on the driving time of the toner supply motor 146 driven by supplying the toner. However, the processor 43 may estimate the remaining amount of toner using another method. For example, the processor 43 may estimate the remaining amount of toner based on the number of rotations of the toner supply motor 146 instead of the driving time. Even in this case, similar correction values to those of the foregoing embodiment are stored in the count value correction table. The number of rotations of the toner supply motor 146 is a specific example of the driving information.

Each correction value of the count value correction table may be arbitrarily changed via the control panel 12 or the communication unit 41. For example, a maintenance worker of the image forming apparatus 100 may check a use situation of the image forming apparatus 100 via a network. The maintenance worker may determine an optimal correction value based on the cumulative driving time of the toner supply motor 146, the remaining amount of toner of the toner cartridge, and an image forming situation. The optimal correction value is a value in which an actual decreased amount of toner in a cartridge is closer to the calculated supplied amount of toner. In this case, the maintenance worker inputs an optimal correction value by operating an external apparatus provided at a remote location such as a service center. The communication unit 41 of the image forming apparatus 100 acquires the optimal correction value input to the external apparatus. The processor 43 records the acquired correction value in the count value correction table. The maintenance worker may set an optimal correction value in the image forming apparatus 100 by operating the control panel 12. The optimal correction value is a kind of change information.

In the above-described two embodiments, the driving amount of the driving member is the driving time or the number of rotations of the toner supply motor 146.

In the above-described embodiments, the image forming apparatus 100 is configured to calculate the supplied amount of toner, but an exemplary embodiment is not limited thereto. For example, the supplied amount of toner may be calculated based on an external apparatus. In this case, the image forming apparatus 100 transmits the driving time of the toner supply motor 146 to the external apparatus.

In the foregoing embodiments, the image forming apparatus 100 is configured to estimate the remaining amount of toner, but an exemplary embodiment is not limited thereto. For example, the remaining amount of toner may be estimated based on an external apparatus. In this case, the image forming apparatus 100 transmits a driving time of the toner supply motor 146 to the external apparatus.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a printer that forms an image on a sheet with a toner;
    a toner cartridge mounted in the printer;
    a motor that supplies toner from the toner cartridge to the printer;
    a storage that stores correction information regarding correction of a supplied amount of the toner from the toner cartridge and the remaining amount of the toner in the toner cartridge; and a controller which
acquires driving information regarding driving of the motor,
acquires the correction information in accordance with the remaining amount of the toner in the toner cartridge,
estimates the remaining amount of the toner in the toner cartridge based on the driving information and the correction information when the remaining amount of the toner in the toner cartridge stored in the storage satisfies a predetermined condition regarding the remaining amount, and
estimates the remaining amount of the toner in the toner cartridge based on the driving information when the remaining amount of the toner in the toner cartridge stored in the storage does not satisfy the predetermined condition.

2. The apparatus according to claim 1, wherein
the driving information relates to a driving amount of the motor driven in accordance with the supply of the toner, and
the controller calculates a cumulative supply amount of the toner based on the driving information and estimates the remaining amount of the toner based on the cumulative supply amount.

3. The apparatus according to claim 1, wherein
the driving information is information regarding a driving amount of the motor driven in accordance with the supply of the toner, and
the controller estimates the remaining amount of the toner by decreasing the supplied amount of the toner obtained based on the driving information from the remaining amount of the toner.

4. The apparatus according to claim 1, wherein
the driving time is a driving time of the motor.

5. The apparatus according to claim 1, wherein
the motor is a toner supply motor and the driving information is the number of rotations of the motor.

6. The apparatus according to claim 1, wherein
for the correction information, the supplied amount of the toner decreases at a predetermined ratio in accordance with the remaining amount of the toner.

7. The apparatus according to claim 6, wherein
for the correction information, the supplied amount of the toner decreases at a larger ratio as the remaining amount of the toner decreases.

8. The apparatus according to claim 1, wherein
the controller acquires change information for changing the correction information and records correction information changed based on the change information in the storage.

9. The apparatus according to claim 8, further comprising:
a communication component that receives the change information from an external apparatus, wherein
the controller changes the correction information based on the received change information.

10. An image forming apparatus, to which a toner cartridge is mountable, the image forming apparatus comprising:
a printer that forms an image on a sheet with a toner;
a motor that supplies toner from the toner cartridge to the printer;
a storage that stores correction information regarding correction of a supplied amount of the toner from the toner cartridge and the remaining amount of the toner in the toner cartridge; and
a controller which
acquires driving information regarding driving of the motor,
acquires the correction information in accordance with the remaining amount of the toner in the toner cartridge,
estimates the remaining amount of the toner in the toner cartridge based on the driving information and the correction information when the remaining amount of the toner in the toner cartridge stored in the storage satisfies a predetermined condition regarding the remaining amount, and
estimates the remaining amount of the toner in the toner cartridge based on the driving information when the remaining amount of the toner in the toner cartridge stored in the storage does not satisfy the predetermined condition.

11. The apparatus according to claim 10, wherein
the driving information relates to a driving amount of the motor driven in accordance with the supply of the toner, and
the controller calculates a cumulative supply amount of the toner based on the driving information and estimates the remaining amount of the toner based on the cumulative supply amount.

12. The apparatus according to claim 10, wherein
the driving information is information regarding a driving amount of the motor driven in accordance with the supply of the toner, and
the controller estimates the remaining amount of the toner by decreasing the supplied amount of the toner obtained based on the driving information from the remaining amount of the toner.

13. The apparatus according to claim 10, wherein
the driving time is a driving time of the motor.

14. The apparatus according to claim 10, wherein
the motor is a toner supply motor and the driving information is the number of rotations of the motor.

15. The apparatus according to claim 10, wherein
for the correction information, the supplied amount of the toner decreases at a predetermined ratio in accordance with the remaining amount of the toner.

16. The apparatus according to claim 15, wherein
for the correction information, the supplied amount of the toner decreases at a larger ratio as the remaining amount of the toner decreases.

17. The apparatus according to claim 10, wherein
the controller acquires change information for changing the correction information and records correction information changed based on the change information in the storage.

18. The apparatus according to claim 17, further comprising:
a communication component that receives the change information from an external apparatus, wherein
the controller changes the correction information based on the received change information.

19. A method performed by an image forming apparatus, comprising:
acquiring driving information regarding driving of a motor configured to supply toner from a toner cartridge to a printer;
acquiring correction information in accordance with a remaining amount of the toner in the toner cartridge;
estimating the remaining amount of the toner in the toner cartridge based on the driving information and the correction information when the remaining amount of the toner in the toner cartridge stored in a storage satisfies a predetermined condition regarding the remaining amount; and estimating the remaining amount of the toner in the toner cartridge based on the driving information when the remaining amount of the toner in the toner cartridge stored in the storage does not satisfy the predetermined condition.

20. The method according to claim 19, wherein the driving information relates to a driving amount of the motor driven in accordance with a supply of the toner, further comprising:

calculating a cumulative supply amount of the toner based on the driving information and estimating the remaining amount of the toner based on the cumulative supply amount.

* * * * *